Jan. 7, 1936.　　　H. W. PARTLOW　　　2,026,699
THERMAL ELECTRIC CONTROL
Filed May 6, 1935　　　2 Sheets-Sheet 1
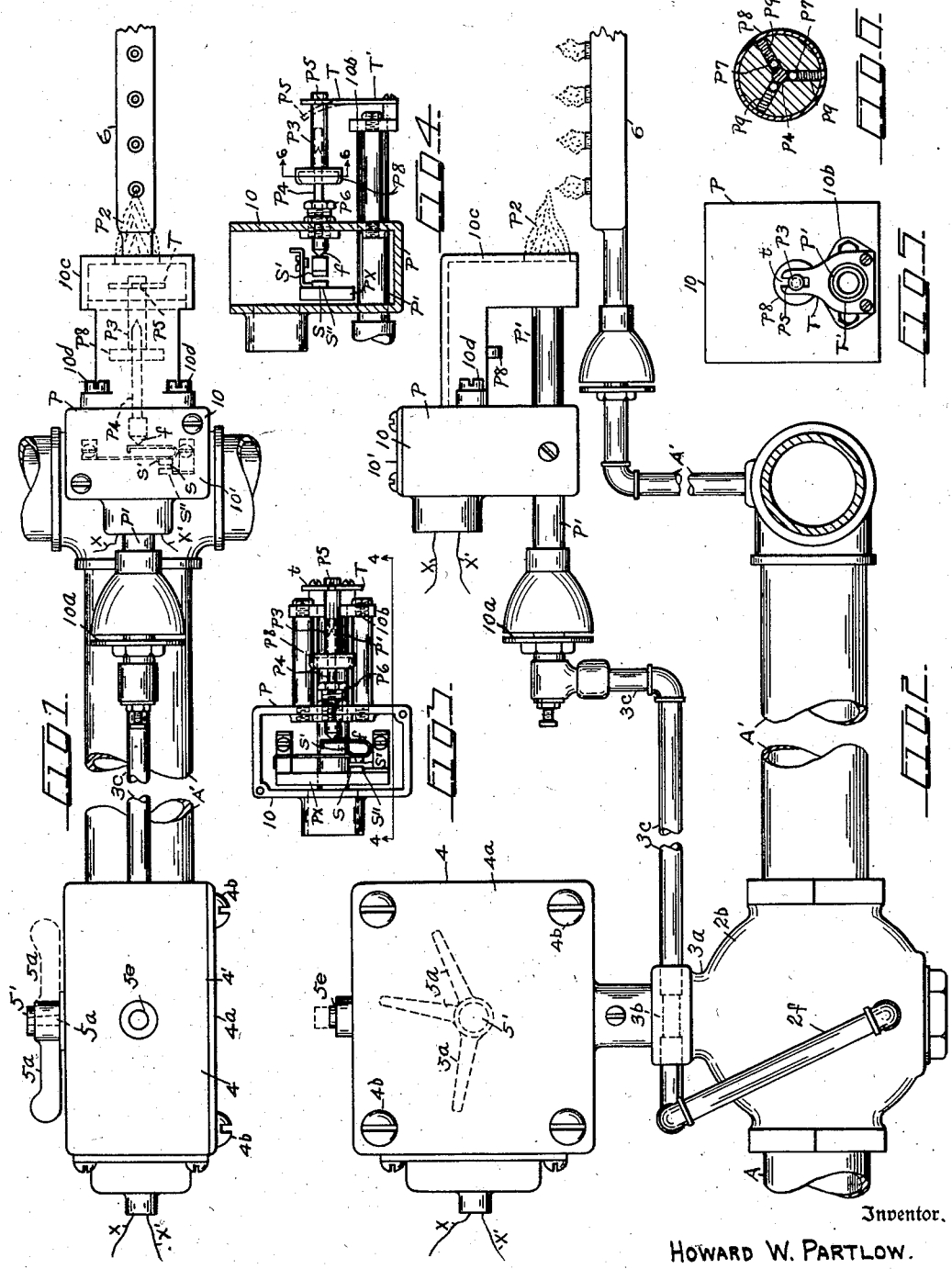
Inventor,
HOWARD W. PARTLOW.
By
Harry De Wallace
Attorney.

Jan. 7, 1936.  H. W. PARTLOW  2,026,699
THERMAL ELECTRIC CONTROL
Filed May 6, 1935    2 Sheets-Sheet 2
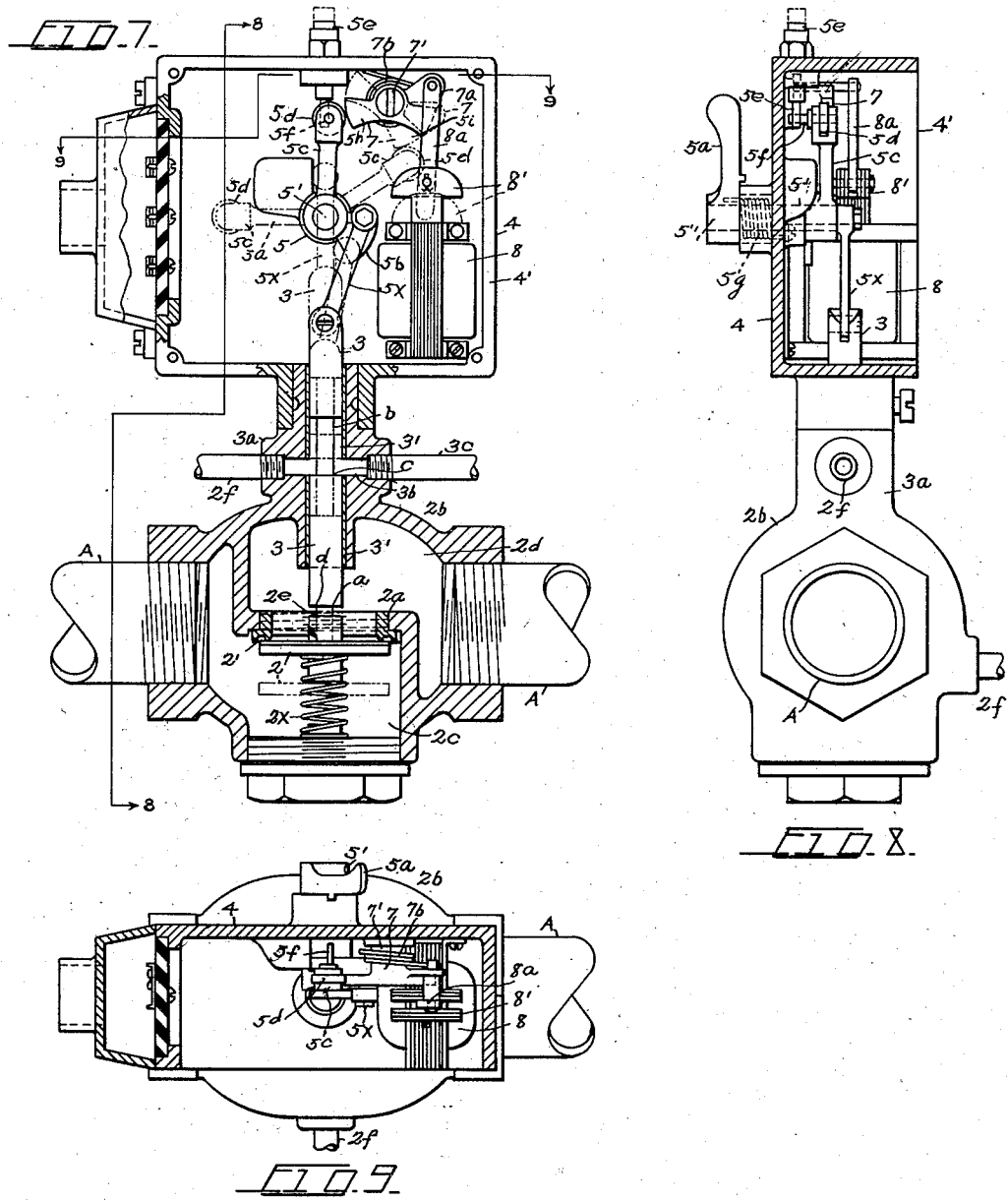
Inventor,
HOWARD W. PARTLOW.
Attorney.

Patented Jan. 7, 1936

2,026,699

UNITED STATES PATENT OFFICE 2,026,699

THERMAL-ELECTRIC CONTROL

Howard W. Partlow, Utica, N. Y., assignor to The Partlow Corporation, New Hartford, Conn., a corporation of New York Application May 6, 1935, Serial No. 19,929

4 Claims. (Cl. 158—117.1)

This invention relates to improvements in automatic controls, designed for use in connection with industrial and other high and low pressure gas-burning heaters generally, and the invention has particular reference to improvements in the fuel-gas governors shown and described in my United States Patent No. 1,823,122, dated September 15, 1931.

The primary object of the present invention is to provide a safety gas valve to supply the fuel direct to the burners of the heaters and also to a novel pilot burner unit that is arranged to thermally and electrically operate or control the opening and closing of the main valve; the controlling unit may comprise a hollow body that is mounted upon and communicates with the main valve casing, and contains the fuel dispensing mechanism, which includes external lever means for manually initiating the heating and controlling cycles, by diverting a slight feed of the gas from the main valve to inaugurate the operations of the pilot burner. After the pilot burner is lighted and the thermostatic element carried by it becomes suitably heated, the latter operates a switch that also forms a part of the pilot mechanism, to close an electric circuit that energizes a solenoid or electromagnetic element located in said body and connected with manual valve-opening means, but is incapable at this initial stage, of automatically opening or of exercising any control of the valve, until the operator manipulates the hand lever a second time for mechanically opening the valve to start a heating period. The solenoid, which by this time has become energized by the closing of the switch in the pilot burner unit, may then act to hold the main valve open for supplying the fuel-gas that afterwards keeps the pilot and heater burners lighted, until the plant is closed down, or until the pilot burner becomes extinguished due to drafts or other causes. The extinguishment of the pilot burner causes the thermostatic element to cool off, and in so doing it breaks or opens the electric circuit, deenergizes the solenoid, and thereby allows the valve to be closed automatically by the tension of a spring that holds the valve closed until the above described operating cycle is repeated. The inclusion in the pilot burner mechanism of the sensitive thermostatic element and the switch which controls the electric circuit that actuates the solenoid, constitutes a novel, extremely simple, quick-acting and reliable governor that may be connected with any appliance that uses heat, whether produced by gas, oil, electricity or other heating agencies, that cannot fail to effect the closing of the main fuel valve in any emergency that may arise. And a further object is to provide a single valve for dispensing the fuel-gas to both the main heating burners and the pilot burner, in association with novel thermostatic means for effecting the instant closing of said valve, in case of the failure of the pilot burner, the supply of the fuel-gas or the breaking of the electric circuit that actuates the solenoid.

I attain these objects by the means set forth in the detailed description which follows, and as illustrated by the accompanying drawings, in which—

Figure 1 is a broken top plan view of the safety valve and pilot burner unit in the act of controlling the heating of the burners of ovens and the like. Fig. 2 is a broken side elevation of the same. Fig. 3 is a top plan view of the pilot burner unit with the cover of the hollow body removed, showing the tubular pilot burner, the thermostat, the switch that makes and breaks the solenoid electric circuit, and the circuit closing medium reciprocated by the thermostat. Fig. 4 is a vertical cross section taken on line 4—4 of Fig. 3. Fig. 5 is a front end elevation of the same. Fig. 6 is a vertical cross section taken on line 6—6 of Fig. 4, showing the frictional drive for the switch operating means. Fig. 7 is a front face view of the body with the cover removed and a central vertical longitudinal section through the main valve, showing the valve closed while the lower dotted lines show both valves open to feed the gas to the main burner, also showing the duct that supplies gas to the pilot burner open, also showing the manually controlled mechanism in its first operated position. Fig. 8 is a vertical cross section taken on line 8—8 of Fig. 7. And Fig. 9 is a horizontal section taken on line 9—9 of Fig. 7.

In the drawings, referring to Fig. 7, 2 represents the main gas valve which comprises a disc-like body, and 2' represents the seat which is disposed in an opening in the wall 2a that divides the interior of the valve casing 2b into receiving chamber 2c and discharge chamber 2d. The main valve may receive and discharge the fuel gas through pipes A and A'. The valve 2 is formed with a hollow axial hub 2e that receives and guides the lower reduced end a of a solid reciprocatable plunger 3 that extends upwardly through an axial bore 3' of an integral cross-fitting or neck that forms the T-shaped top portion 3a of the casing 2b. Thus it will be seen that the reduced end a of the plunger 3 has vertical telescopic movement within the hollow axial hub 2e of the valve 2. 2x represents a stout spiral spring that exerts its tension for closing the valve 2. The extended top portion 3a of the casing 2b is also preferably bored horizontally, as at 3b, to intersect the bore 3' and provide an outlet for supplying gas to a pilot burner unit P that controls the emergent closing of valve 2. The safety control mechanism, aside from the pilot burner P and related parts, preferably comprises a hollow body 4, that is mounted upon and communicates with the valve casing 2b and cross-duct 3b. The front side 4' of body 4 is normally open and may be closed by a cover 4a secured by screws 4b. Within the body 4 is disposed a crank 5, which is rocked by means of an axial stem 5' that extends through the rear wall of the housing, and whose outer end is fitted with a hand-lever 5a by which the crank is operated. A depending quadrant-shaped arm 5b of the crank is pivotally connected by means of a link 5x, to the top end of the plunger 3 that aligns with the axis of and is adapted to depress and open the valve 2. The manual clockwise rocking of the crank 5 from the horizontal to the vertical position in Fig. 7, by the corresponding movement of the handle 5a, initially depresses the link 5x and plunger 3 for feeding gas from the valve to the pilot burner P, and eventually opens the valve its full extent for dispensing the gas through pipe A' to a main heater burner, as 6. For this purpose, the plunger 3 is formed medially with a reduced portion b, that is defined in part by a shoulder c, which when positioned across the passage 3b by the initial rocking of crank 5, allows the gas to pass through a pipe 2f, that taps the bottom valve chamber 2c, towards the pipe 3c that conducts the light flow of gas to the pilot burner P. The crank 5 is formed with another arm 5c whose free end is fitted with a friction roller 5d that engages one end 5h of a rockable cam 7 that momentarily stops the crank. This constitutes the first manual operation of the lever and crank to depress the plunger 3 for primarily opening the passage 3b in the pilot-gas line, as explained. The cam 7 is pivoted by a pin 7' to the rear wall of the body 4 and is formed with a lug or ear 7a that is pivotally connected by a link 8a, to the top end or head of the armature 8' of a solenoid or electromagnetic element 8, which, when energized, holds the valve 2 open, as during the heating periods. When the crank 5 is first rocked towards the end 5h of the cam 7 (see full lines Fig. 7), the parts may be held in such position temporarily by a push button or pin 5e that extends downwardly through the top of the body and across the path of a stud 5f carried by the arm 5c to prevent accidental recoil of the handle and the crank, as shown in Figs. 7 and 8. This first stoppage of the crank 5 is to allow time for the operator to light the pilot burner P (see Figs. 1 and 2), to initiate the thermal-electric control, as will be explained later on.

The pilot burner unit P comprises a hollow body 10 having a normally open top that is closed by a cover 10'. The body is mounted upon and supported by a pipe P' that passes through the body and receives gas dispensed by the pipe 3c and the usual air-shutter 10a, and conducts the gas beyond the body and through a head 10b, which in turn supports the thermostatic element. The free end of pipe P' constitutes the tip of the burner whereat the gas is burned, with a flame P2 (see Figs. 1 and 2) that is directed towards one or more of the main burners, as 6, of an oven or furnace (not shown). The projecting parts comprising the pipe P', the head 10a and the thermostat and related parts, are all covered and protected from disturbing draughts, as well as from reflected heat from the nearby heater burners, by a hood or housing, as 10c, which is removably secured to the body by screws 10d. The thermostatic element in the present pilot burner consists of a relatively thin flat bi-metal strip T that is disposed in the path of the flame P2, the said strip having an opening T' through which the flame is projected and heats the said strip. As the strip T warms up, its top end flexes towards the body 10 (see Fig. 4) and carries with it a sleeve P3 that telescopes and slides on a lava-tipped rod P4, which actuates a switch S in the body 10 that comprises contacts S'—S'', which open and close an electric circuit x—x' that energizes the solenoid 8. The switch S and related parts are preferably mounted upon a lava block Px, so that a relatively high degree of heat will not effect the operation of the electric controlling parts. The sleeve P3 and rod P4 are reciprocated by the heating and cooling or flexing of the element T; the sleeve having a limited axial movement on the rod. For this purpose, the sleeve has a circumferential groove P5 (see Figs. 1, 4 and 5) that is engaged by the forked top end t of the element T, so that when the element is heated, it flexes or bends towards the switch S and carries rod P4 with it by virtue of a braking or friction means until the switch S is closed. Any further heating and flexing of the thermostat T will effect a sliding of the sleeve P3 on rod P4. The sleeve P3 is equipped with a braking means consisting of a ring of balls P7 (see Fig. 6) which are disposed in a drum P8 that is carried by the sleeve; each ball being tensioned by a radially disposed spring P9 that forces the balls against the rod and creates frictional resistance to the free sliding of the sleeve; the grip of the balls being such as to move the sleeve and rod substantially as one part in the direction to close the switch S for energizing the solenoid 8. The friction means is provided mainly so that sleeve P3 and rod P4 will move as one, upon the first slight movement of the thermostat T toward the switch S, thereby causing the switch to close almost immediately after the pilot burner is lighted. As the thermostat becomes further heated, due to the continuing gas flame P2, sleeve P4 is now free to slide on rod P3, since the rod is constrained from further movement by the contacts of the switch. When the thermostat has attained its maximum temperature from the pilot flame, all the parts of the burner remain in that position for the duration of the heating, or until the pilot is extinguished. In the latter event, the thermostat T cools off and moves or pulls the rod P4 and sleeve P3 in the opposite direction to open switch S, deenergize the said circuit, and allow valve 2 to close and shut down the plant to prevent damage by explosions or from other causes. Upon the first slight relaxing movement of the thermostat T, the grip on the rod P4 by the balls, moves the lava tip f of the rod, at substantially the speed of the sleeve, out of engagement with the movable member S' of the switch S, which effects the instant breaking of the circuit that otherwise might be delayed long enough to invite damage from explosions or other causes. As the backward movement of rod P4 and sleeve P3 continues, the enlarged end of lava tipped rod will engage the end of the adjustable screw P6, and thus constrained from further backward movement, sleeve P3 is now free to slide on rod P4 through said friction means until the thermostat has entirely cooled down and come to rest. When the thermostatic element T, following the first clockwise operation of the handle 5a and crank 5, becomes suitably heated by the pilot flame, the operator swings the lever 5a and crank 5 still farther in the clockwise direction for mechanically depressing the plunger 3 to enable a shoulder d on its lower end to engage the hub 2e of the valve and open the valve 2 its full extent (see dotted lines Fig. 7) to supply the fuel gas to the heater burners 6. Immediately following this final operation of crank 5, the circuit x—x' just completed by the initial heating of the thermostat actuates the solenoid 8, thereby effecting the interlocking of the opposite end 5i of the cam 7 and arm 5c of the crank (see righthand dotted position in Fig. 7), for holding the valve 2 open for the duration of the heating of an oven, and at the same time, due to the connection of the armature 8' of the solenoid with the lug 7a of cam 7, effects the interlocking of the crank 5 and end 5i of the cam 7 to prevent accidental closing of the main valve, as shown at the right in Fig. 7.

The downward movement of the link 8a under the influence of the solenoid 8 and armature 8' tilts the cam 7 to its dotted position. This allows the operator to move the hand lever 5a and arm 5c towards the right, and owing to a slight looseness of the several pivot joints between the armature and link as well as the pivot axis 7', and the capability of a slight axial movement of the armature 8' against the magnetic pull of the coil, the free end of the arm 5c snaps past the right end of the cam and prevents said arm from being prematurely freed, which premature freeing would allow the valve to move upwardly towards its seat for shutting off the supply of the gas to the oven and pilot burners. This interlocked state of the end 5i of the cam 7 and crank 5 will thereafter continue as long as the main heater operates normally. When however, the pilot burner becomes extinguished by the breaking of the electric circuit x—x', or through pilot or other failure, the solenoid 8 becomes deenergized, which releases or unlocks the end 5i of the cam 7 and and arm 5c, that enables the spring 7b to tilt the cam upwardly so as to allow the crank to be restored to its normal rest or starting position, shown by the left dotted lines in Fig. 7, which effects the instant closing of the valve 2 by the tension of the spring 2x. This effects the shutting down of the heating plant and restores, by means of a spiral spring 5g (see Fig. 8), the handle 5a, crank 5 and plunger 3, to the initial position, and also shuts off the pilot duct b. This ready-to-act position of the operating mechanism will then remain until the pilot burner is again lighted, as explained.

Between the first and second manual operations of the lever 5a, the tension of spring 7b cooperates with the stop pin 5e for temporarily locking the cam against the valve-opening movement by the crank arm 5c coming in contact with the end 5h of the cam 7, as shown in Fig. 7, so that the valve 2 cannot be opened until the pilot burner thermostat has become heated, completed the circuit x—x', energized the solenoid 8 and rocked cam 7 to the dotted position in Fig. 7. Then, and not until then, can the operator move lever 5a to its second position, thus bringing roller 5d to its final position at the right of the end 5i of the cam 7, as shown by the dotted lines in Fig. 7, and thereby holding valve 2 in its wide open position until the pilot flame is extinguished or the electric circuit is broken.

Having thus described my invention, what I claim, is—

1. A control of the character described, including a source of fuel supply, a main burner, a pilot burner in lighting relation to the main burner and connected to the source of fuel supply of the main burner, a main valve normally biased toward closed position for controlling the fuel supply to the main burner, an auxiliary valve for controlling the supply of fuel to the pilot which upon movement in one direction opens said main valve, manually operable means, means connecting the manual means and the auxiliary valve to initially open said auxiliary valve when the manual means is moved a predetermined distance in one direction, tensioned latch means to retard further opening movement of said manual means until the pilot is ignited and thermo-magnetic means operable by said pilot to move said latch means out of the path of said manual means, whereby to permit continued forward movement of the manual means thereby to cause engagement of the auxiliary valve with the main valve to open said main valve, and to also cause said thermo-magnetic means to effect movement of the latch means into the return path of the manual means to prevent retrograde movement thereof and the closing of said valves, said auxiliary valve being formed to close under the normal closing movement of the main valve upon failure of the burners and the subsequent cooling of the thermo-magnetic means and withdrawal of the latch means from the path of the manual means to permit reverse movement thereof and the closing of said auxiliary and main valves.

2. A control of the character set forth in claim 1 wherein the manual means includes a spring tensioned pivoted crank and the latch means includes a pivoted spring tensioned cam.

3. A control of the character set forth in claim 1 wherein the manual means includes a pivoted spring tensioned crank having means operable thereby to open the main valve, and wherein the latch means is composed of a single spring tensioned member.

4. A control of the character set forth in claim 1 wherein the manual means includes a pivoted spring tensioned crank having means operable thereby to open the main valve, and wherein the latch means is composed of a single member having multiple operating faces for engaging the manual means at predetermined intervals in the forward and reverse movements of said manual means.

HOWARD W. PARTLOW.

CERTIFICATE OF CORRECTION.

Patent No. 2,026,699.                                           January 7, 1936.

HOWARD W. PARTLOW.

It is hereby certified that error appears in the above numbered patent requiring correction as follows: In the grant, and heading to the printed specification, the residence of the assignee was erroneously described and specified as "New Hartford, Connecticut" whereas said residence should have been described and specified as New Hartford, Oneida County, New York, as shown by the records of assignments in this office; and that the said Letters Patent should be read with this correction therein that the same may conform to the record of the case in the Patent Office.

Signed and sealed this 18th day of February, A. D. 1936.

(Seal)
                                                  Leslie Frazer
                                         Acting Commissioner of Patents.